(12) United States Patent
Jones et al.

(10) Patent No.: US 10,337,331 B2
(45) Date of Patent: Jul. 2, 2019

(54) MANUFACTURE OF COMPONENT WITH CAVITY

(71) Applicant: ROLLS-ROYCE plc, London (GB)

(72) Inventors: Simon Jones, Bristol (GB); Matthew Tucker, Weston-Super-Mare (GB)

(73) Assignee: ROLLS-ROYCE plc, London (GB)

( * ) Notice: Subject to any disclaimer, the term of this patent is extended or adjusted under 35 U.S.C. 154(b) by 289 days.

(21) Appl. No.: 15/151,996

(22) Filed: May 11, 2016

(65) Prior Publication Data

US 2016/0356162 A1 Dec. 8, 2016

(30) Foreign Application Priority Data

Jun. 3, 2015 (GB) .................................. 1509580.5

(51) Int. Cl.
*F01D 5/18* (2006.01)
*B23K 15/00* (2006.01)
(Continued)

(52) U.S. Cl.
CPC ............ *F01D 5/18* (2013.01); *B23K 15/0086* (2013.01); *B23K 15/0093* (2013.01); *B23K 26/342* (2015.10); *F01D 25/12* (2013.01); *B23K 2101/001* (2018.08); *B23K 2103/26* (2018.08); *B33Y 10/00* (2014.12); *B33Y 80/00* (2014.12);
(Continued)

(58) Field of Classification Search
CPC . F01D 5/18; F01D 25/12; F01D 5/147; F01D 5/143; F01D 5/181; B23K 15/0093; B23K 15/0086; B23K 26/342; B23K 2103/26; B23K 2101/001; F05D 2230/22; F05D 2240/35; F05D 2230/31; F05D 2240/24; B33Y 10/00; B33Y 80/00; B33Y 40/00; B22F 3/1028; B22F 3/1021; B22F 3/1055; B22F 2003/247; B22F 5/10; B22F 5/106; B29C 35/16; B29C 64/153
See application file for complete search history.

(56) References Cited

U.S. PATENT DOCUMENTS

2002/0152715 A1 10/2002 Rotheroe
2006/0118532 A1 6/2006 Chung et al.
(Continued)

FOREIGN PATENT DOCUMENTS

JP 2004-027328 A 1/2004
WO 94/12284 A1 6/1994
(Continued)

OTHER PUBLICATIONS

Sep. 1, 2015 Search Report issued in British Patent Application No. GB1509580.5.

*Primary Examiner* — Jun S Yoo
(74) *Attorney, Agent, or Firm* — Oliff PLC

(57) ABSTRACT

A method for the manufacture of a component having an internal cavity is described. The method comprises; defining an external geometry of the component, defining a core geometry of the component; and using an additive layer manufacturing (ALM) method, building the component from a plurality of layers laid on a first plane. The core geometry is advantageously designed to suit manufacture of the component using an ALM method which involves local melting of powder in a powder bed to form the layers, permitting easy removal of excess powder from the internal cavity.

13 Claims, 2 Drawing Sheets

(51) Int. Cl.
  *B23K 26/342* (2014.01)
  *F01D 25/12* (2006.01)
  *B33Y 10/00* (2015.01)
  *B33Y 80/00* (2015.01)
  *B23K 101/00* (2006.01)
  *B23K 103/18* (2006.01)

(52) U.S. Cl.
  CPC ...... *F05D 2230/22* (2013.01); *F05D 2230/31* (2013.01); *F05D 2240/24* (2013.01); *F05D 2240/35* (2013.01)

(56) References Cited

U.S. PATENT DOCUMENTS

| | | | |
|---|---|---|---|
| 2007/0001342 A1* | 1/2007 | Oberhofer | B22C 7/00 264/237 |
| 2012/0107496 A1 | 5/2012 | Thoma | |
| 2016/0129417 A1* | 5/2016 | Aimone | B01J 19/0093 422/198 |
| 2016/0279871 A1* | 9/2016 | Heugel | B22F 3/1055 |

FOREIGN PATENT DOCUMENTS

| | | |
|---|---|---|
| WO | 2013/017144 A1 | 2/2013 |
| WO | 2015/071184 A1 | 5/2015 |

* cited by examiner

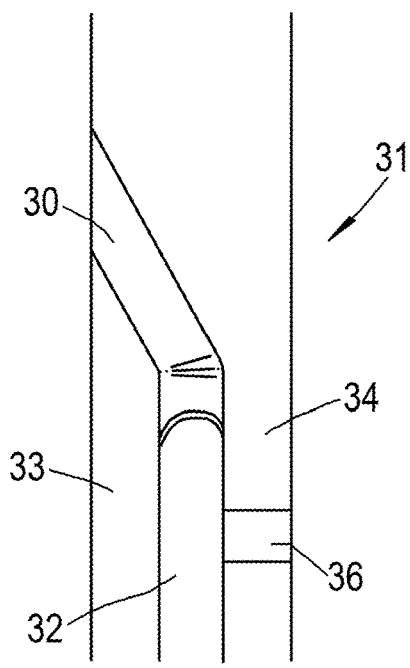
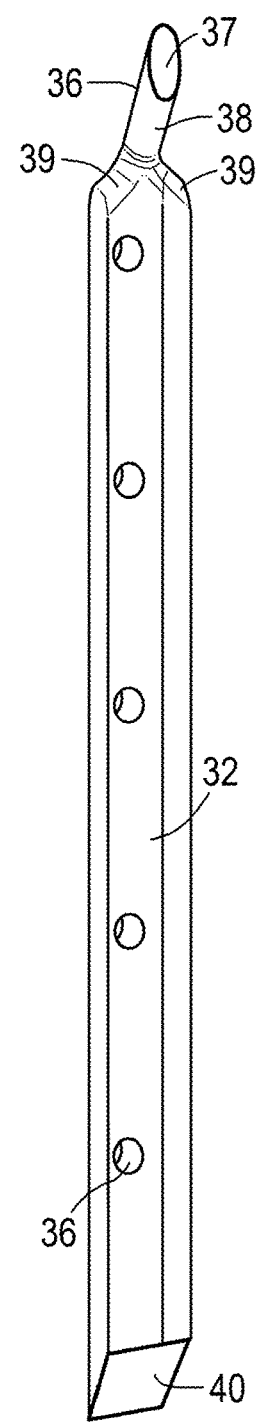
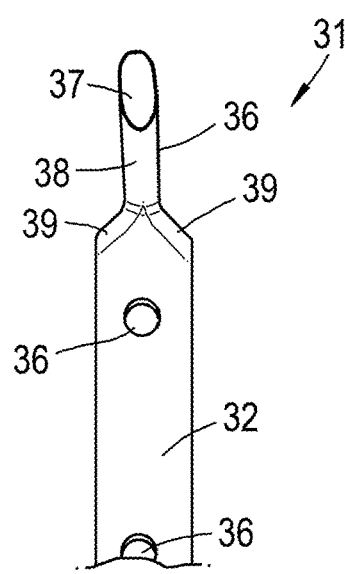

MANUFACTURE OF COMPONENT WITH CAVITY

The present disclosure concerns the manufacture of dual wall components which include cooling holes passing from a hollow core through a wall of the component. More particularly, the invention relates to a core geometry which facilitates the manufacture of such components using an additive layer manufacturing (ALM) process.

It is known to provide dual wall components using a casting method wherein a core is held in place during the casting process. The dual walls are cast around the core which is subsequently leeched from the cast component leaving a cavity between the walls. Cooling holes are then machined into the walls, connecting the outside with the cavity. Due to manufacturing tolerances in such a process, there is a lack of certainty as to the location of corners and end surfaces defining the cavity. To ensure the holes connect with the cavity, they are positioned a distance from the anticipated position of the corners.

Additive layer manufacturing (ALM) methods are known. In these methods a component is built up layer by layer until the 3D component is defined. In some ALM methods, layers are created by selective treatment of layers within a mass of particulate material, the treatment causing cohesion of selected regions of particulates into a solid mass. For example, the particulate is a ferrous or non-ferrous alloy powder and the treatment involves local heating using a laser or electron beam. Specific examples of such ALM methods include (without limitation); laser sintering, laser melting and electron beam melting (EBM).

Additive layer manufacturing (ALM) techniques are known for use in defining complex geometries to high tolerances and can be used as an alternative to casting. However, such methods are not ideally suited to some conventionally used core geometries. For example, where the ALM process uses a bed of particulate material, it is necessary to remove all the untreated particulate from cavities in the defined component. This is more difficult than leeching and removing a more fluid core in a casting process. Adopting the same core geometries as in a casting method can result in un-treated particulate materials becoming stuck in the bottoms and corners of the core cavity. During subsequent heat treatments, these unwelded powders sinter in place altering the intended design of the component to the possible detriment of the performance of the component.

Cast dual wall components are often used in gas turbine engines to define complex aerodynamic shapes. The casting process and materials used provide materials with very specific mechanical properties which need to be preserved in an environment where they are exposed to extremes of temperature and pressure. Hollow cavities are provided within these components and serve to minimise weight, reduce material costs and also provide a conduit through which coolant fluids can be delivered to cool the cast components ensuring that surfaces of the components do not exceed critical temperatures which would affect their mechanical integrity. The cavities are connected to external surfaces of the component by a plurality of small cooling holes through which the fluid passes forming a coolant layer which protects the external surfaces. Incomplete evacuation of core cavities in such designs can lead to a failure of the component and so cannot be tolerated.

According to a first aspect there is provided a method for the manufacture of a component having an internal cavity, the method comprising;

defining an external geometry of the component, defining a core geometry of the component;
using an additive layer manufacturing (ALM) method, building the component from a plurality of layers laid on a first plane;
wherein the core geometry includes a main core passage, a channel extending from a first end of the main core passage to an external surface of the component, the channel having an axis which is inclined at a first angle to an axis of the main core passage whereby to define an apex between walls of the channel and the main core passage which is obtuse, the channel axis further being inclined to the first plane; and the additive layer manufacturing method includes removing excess material from the main core passage via the channel.

The method is well suited to ALM methods which use a powder bed and local melting of the powder to define layers. Once the component has been built, excess powder can conveniently by removed by upturning the component, facing the exit of the first channel downwards and allowing the excess powder to escape through the first channel. The removal step may include the use of a vibrating rig.

The first angle can be between greater than 105 degrees, optionally between 120 and 165 degrees, for example about 135 degrees. The first angle can be selected to suit the external geometry and any limitations on where the channel exit is able to be positioned on the external surface. The first and second angles may be the same or different.

The channel can be blended into the main core passage with a smoothly curved join to minimise the possibility of particulates becoming stuck in tight radii within the core geometry. The channel can be proportioned and positioned such that, once excess material has been removed from the core geometry, the channel can serve a second purpose in the finished component. For example (but without limitation), the channel might serve as a cooling hole, a location for a fastener or the like. Alternatively, the channel can be plugged after removal of the excess material.

The channel can be straight; alternatively the channel can be curved or serpentine. The channel can be round in cross section but other channel cross sections are possible. For example (but without limitation) the channel may have a rectangular, ovoid or a non-axisymmetric cross section.

The core passage can be elongate. The core passage can be devoid of corners and tight radii, at least towards the first end and conveniently throughout the passage. The core passage can be configured to define sloping shoulders extending from the first channel. The core passage may further include a sloped surface at a second end, distal from and facing the first end. The sloped surface at the second end may be inclined at the first angle, in parallel with the first channel axis. The sloped surface is conveniently inclined to the first plane, laid layers of the sloped surface each providing support for the next laid layer as the sloping surface is built. This provides better structural integrity of the end wall.

It will be understood that the geometry of the core passage is not crucial to the method of the invention. For example (but without limitation) the core passage may have a rectangular, ovoid or a non-axisymmetric cross section parallel to the first plane and may have its longest dimension parallel to the plane. Along its longitudinal axis, the core passage may be straight, curved or serpentine.

In addition to the first channel, the core geometry might include additional channels. In some embodiments, the core includes a plurality of additional channels extending from an elongate side of the core passage. For example, one or more of the additional channels may extend orthogonally to the axis of the main core passage. Optionally, an additional channel is located adjacent to a second end of the main core passage which is distal from and facing the first end. This can be a particular advantage where the channels are intended to serve as cooling holes, presenting an opportunity to deliver cooling air across the widest extend of the component. The additional channels may extend orthogonal to the axis of a wall through which they pass or may be inclined to the orthogonal. The additional channels can be straight, curved or serpentine. The channel can be round in cross section but other channel cross sections are possible. For example (but without limitation) the channel may have a rectangular, ovoid or a non-axisymmetric cross section.

Optionally, a series of channels can be arranged and connected in parallel by connecting holes.

The first plane can be parallel to a longitudinal axis of the main core passage. Alternatively, the first plane can be orthogonal to a longitudinal axis of the main core passage.

For example, the component can be manufactured from a ferrous or non-ferrous alloy or a ceramic. The component may be a component for a gas turbine engine. The component may include multiple core passages, each core passage having an associated first channel. First and/or additional channels extending from the core channel may serve as cooling channels in the finished component.

A component manufactured in accordance with a method of the invention may incorporate multiple main core passages. Multiple main core passages may be aligned in series and may optionally be connected by through wall channels.

In another aspect, the invention comprises a gas turbine engine incorporating one or more components manufactured in accordance with the method of the invention.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which:

FIG. 3 shows in a first view, a portion of a component and the core geometry of the component manufactured in accordance with a method of the invention;

FIG. 4 shows in a second view, the core geometry of the component portion of FIG. 3;

FIG. 5 shows in a third view, the core geometry of FIGS. 3 and 4.

Figure 1:
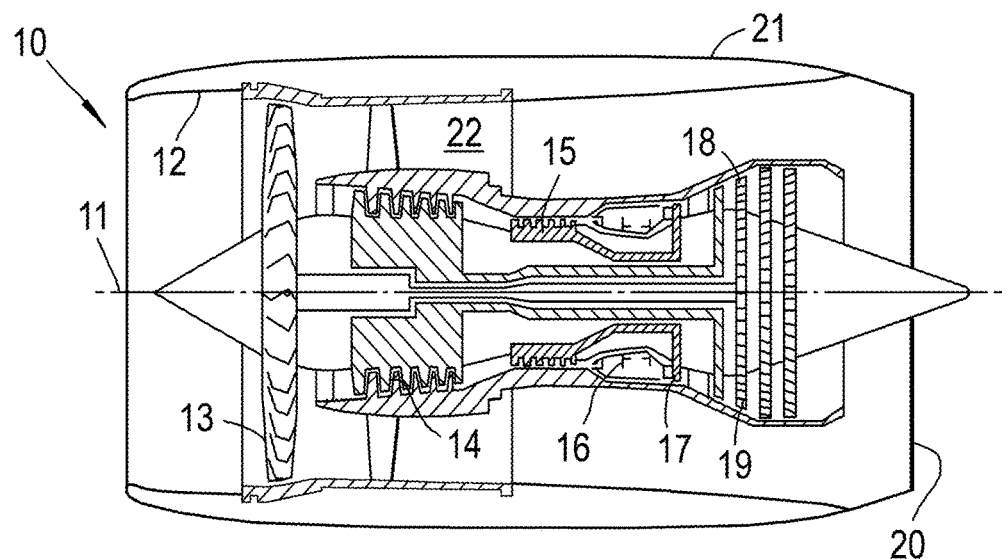
FIG. 1 is a sectional side view of a gas turbine engine which may comprise components made in accordance with the method of the invention.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Many components of the gas turbine engine are dual wall components and their internal geometry could be adapted to facilitate their manufacture by the method of the invention. For example (but without limitation), components in the turbine sections 17, 18 and 19, or the combustor 16 may be manufactured in accordance with the invention. The method is well suited to the manufacture of walls and platforms through which cooling air is often distributed to cool components in these sections.

Figure 2:
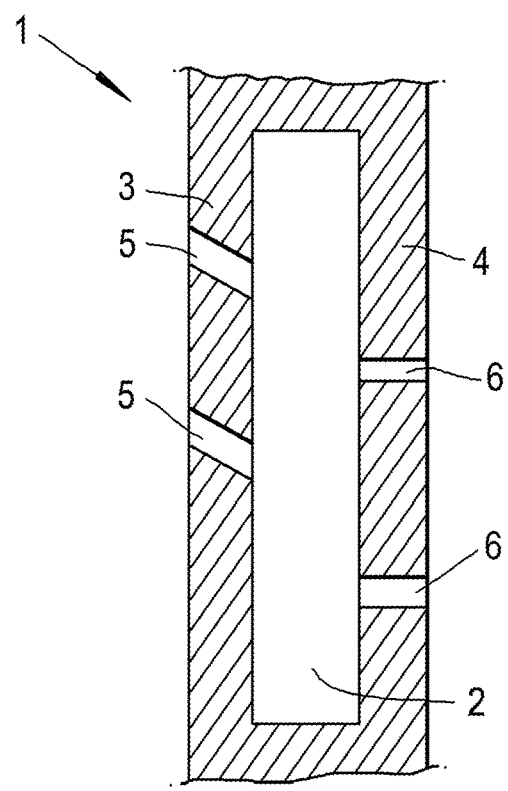
FIG. 2 is a schematic figure of a dual wall component made in accordance with prior known methods.

FIG. 2 shows a dual wall component 1 as is known from the prior art. The component is cast and is provided with a central cavity 2 outlined by elongate side walls 3 and 4. Channels 5 and 6 are machined through the walls into the cavity 2. The cavity 2 is substantially rectangular in cross section with sharp corners. It will also be noted that the junctions between the machined channels 5 and 6 and the cavity 2 are sharply angled. It will be appreciated that the geometry of the cavity 2 and joining channels 5 and 6 is such that it would be difficult to completely evacuate any powder trapped in the cavity 2 from the component 1. The geometry of the core is thus not well suited to some ALM methods.

FIG. 3 shows a first view of a component suited to manufacture in accordance with methods of the present invention. The component 31 has opposing elongate walls 34 and 35 which flank a main core passage 32. At an end of the core passage 32, a first channel 30 extends at an angle to a longitudinal axis of the main core passage 32. The channel extends through wall 33. An additional channel 36 extends orthogonally to the longitudinal axis of the core passage 32 and through wall 34.

FIG. 4 shows another view of the core geometry within the component of FIG. 3. The core geometry has been rotated through 90 degrees about the longitudinal axis of the main core passage. As can be seen, the core passage 32 blends into the channel 36 via sloping shoulders 39. The shoulders 39 are also gently rounded. The channel 36 can be seen to have a sloping length 38 terminating at an exit 37.

FIG. 5 shows the core geometry of FIGS. 3 and 4 in its entirety in a transparent, perspective view. In this embodiment, the core has been rotated approximately a further 45 degrees around the longitudinal axis of the main core passage 32. It can be seen that the core passage 32 is elongate and has multiple channels 36 equally spaced along one side. At an end which is distal from the channel 36, the core passage 32 terminates in an angled face 40. A component with this core geometry can be built upwards from a plane which sits below the angled face 40 and is orthogonal to the longitudinal axis of the core passage 32. Excess powder remaining in the core passage 32 and channels 36 can be removed by upturning the component so that the first channel exit 37 faces downwards. Removal of excess material can be assisted by shaking, tapping or vibrating the component 31.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for manufacturing a component having an internal cavity, the method comprising;
    defining an external geometry of the component;
    defining a core geometry of the component; and
    using an additive layer manufacturing (ALM) method, building the component from a plurality of layers laid on a first plane,
    wherein:
        the core geometry includes a main core passage having an elongated axis, and a channel extending from a first end of the main core passage to an external surface of the component,
        the channel has an axis which is inclined at an obtuse angle relative to an axis of the main core passage such that an apex is provided between walls of the channel and the main core passage,
        the channel is smaller in cross-sectional area than the main core passage at the apex,
        the main core passage is configured to define sloping shoulders extending from the channel where the channel meets the main core passage at the apex,
        the channel axis is further inclined relative to the first plane, and
        the additive layer manufacturing method includes removing excess material from the main core passage via the channel.

2. A method as claimed in claim 1 wherein the ALM method uses a powder bed and local melting to create the layers.

3. A method as claimed in claim 1 wherein the step of removing the excess material involves upturning the component such that the channel faces downward, and agitating the component.

4. A method as claimed in claim 1 wherein the obtuse angle of the apex is greater than 105 degrees.

5. A method as claimed in claim 4 wherein the angle of the apex is in a range of 120 to 165 degrees.

6. A method as claimed in claim 1 wherein the channel is blended into the main core passage with a smoothly curved join.

7. A method as claimed in claim 1 wherein the main core passage is elongate.

8. A method as claimed in claim 1 wherein the main core passage includes a sloped surface at a second end, distal from and facing the first end.

9. A method as claimed in claim 1 wherein the core includes a plurality of additional channels extending from an elongate side of the main core passage.

10. A method as claimed in claim 9 wherein the plurality of additional channels extend orthogonally to a longitudinal axis of the main core passage and/or in parallel with the first plane.

11. A method as claimed in claim 8 wherein an additional channel is located adjacent to the second end of the main core passage.

12. A method as claimed in claim 1 wherein the first plane is orthogonal to a longitudinal axis of the main core passage.

13. A method as claimed in claim 1 wherein the layers are formed from a ferrous or non-ferrous alloy, or a ceramic.

* * * * *